(12) United States Patent
Dupel et al.

(10) Patent No.: US 6,331,362 B1
(45) Date of Patent: Dec. 18, 2001

(54) REFRACTORY COMPOSITE MATERIALS PROTECTED AGAINST OXIDISING AT HIGH TEMPERATURE, PRECURSORS OF THE SAID MATERIALS, THEIR PREPARATION

(75) Inventors: Pascal Dupel, Roon Twp, PA (US); Jean-Bernard Veyret, Ez Bergen (NL)

(73) Assignee: European Atomic Energy Community (EUROTOM), Luxembourg (LU)

( * ) Notice: Subject to any disclaimer, the term of this patent is extended or adjusted under 35 U.S.C. 154(b) by 0 days.

(21) Appl. No.: 09/147,413
(22) PCT Filed: Jun. 16, 1997
(86) PCT No.: PCT/FR97/01084
  § 371 Date: Apr. 21, 1999
  § 102(e) Date: Apr. 21, 1999
(87) PCT Pub. No.: WO97/48663
  PCT Pub. Date: Dec. 24, 1997

(30) Foreign Application Priority Data

Jun. 19, 1996 (LU) .......................................... 88773

(51) Int. Cl.⁷ ....................................................... B32B 9/00
(52) U.S. Cl. ........................... 428/689; 428/403; 428/404; 428/367; 428/368; 428/688; 427/215; 427/419.1; 427/419.7; 427/419.8; 427/585; 427/589; 427/590
(58) Field of Search ..................................... 427/215, 585, 427/419.1, 589, 419.7, 590, 419.8; 428/403, 404, 698, 367, 368, 688, 689; 501/95.1, 94, 95.2, 96.1

(56) References Cited

U.S. PATENT DOCUMENTS

| | | |
|---|---|---|
| 3,811,928 | 5/1974 | Henney et al. ........................ 117/106 |
| 4,093,771 * | 6/1978 | Goldstein et al. . |
| 4,143,182 | 3/1979 | Henney et al. ........................ 427/226 |
| 4,457,958 | 7/1984 | Lange et al. .......................... 427/314 |
| 4,863,773 | 9/1989 | Rousseau et al. ....................... 428/68 |
| 4,976,899 | 12/1990 | Rousseau et al. ................... 264/29.5 |

\* cited by examiner

*Primary Examiner*—Richard Weisberger
(74) *Attorney, Agent, or Firm*—Bacon & Thomas, PLLC

(57) ABSTRACT

The present invention provides:

refractory composite materials protected against oxidation at high temperature; said materials are of the type made by a solid process and include, in characteristic manner, over their entire outside surface, a complex layer containing at least one silicate corresponding to a densification additive used to make them, silica, and a vitreous boron-containing silicate phase;

precursors or intermediates for preparing said materials; said precursors including, in characteristic manner, over their entire outside surface, at least one layer of a precursor for borosilicate glass or a layer of borosilicate glass; and a method of preparing said materials (by preparing said precursors) and a method of preparing said precursors.

17 Claims, 1 Drawing Sheet

REFRACTORY COMPOSITE MATERIALS PROTECTED AGAINST OXIDISING AT HIGH TEMPERATURE, PRECURSORS OF THE SAID MATERIALS, THEIR PREPARATION

BACKGROUND OF THE INVENTION

The present invention relates to:

refractory composite materials protected against oxidation at high temperature;

precursors or intermediate substances for preparing said materials; and preparing said materials (by preparing said precursors), and preparing said precursors.

More precisely, the present invention relates to providing protection at high temperature (up to 1500° C. to 1600° C.) in an oxidizing atmosphere for highly refractory ceramic matrix composite materials that are reinforced by fibers that are known for being sensitive to oxygen at low temperature (below 900° C.); said composite materials being made via a solid process.

A solid process is a third process, distinct from the liquid process or the gas process, suitable for making composite materials. It is familiar to the person skilled in the art and generally comprises the following three steps:

- a first step of preparing a slip (precursor of the matrix in the final product): suitable inorganic powders ($Si_3N_4$, SiC, . . . ) and appropriate additives (densification additives such as $Al_2O_3$ and $Y_2O_3$, dispersants, and/or wetting agents, . . . ) are put into suspension in water;
- a second step of incorporating fibers (reinforcing fibers) in said slip and of consolidating the whole (shaping by filtering under pressure): at the end of this step, the objective is to obtain a raw product of a density that is as high as possible; and
- a third step of densification: this comprises sintering the raw product, which may be performed at a temperature higher than 1600° C., under load (a mechanical pressure is generated, e.g. 27 MPa), in an inert atmosphere or under inert gas pressure (the pressure imposed generally lies in the range 10 bars to 100 bars); in one or other of said contexts the inert gas used generally consists in nitrogen or argon; argon being recommended for use with silicon carbide.

A variant of that solid process is described in patent application CA-A-2 145 706.

DESCRIPTION OF THE RELATED ART

Prior art composite materials of the kind to which the present invention relates, i.e. composite materials made using the solid process and of the type recalled above [having a highly refractory ceramic matrix (e.g. a matrix of SiC, $Si_3N_4$, or SiAlON) reinforced by fibers that are sensitive to oxygen, such as long carbon fibers or long ceramic fibers (e.g. of the SiC, $Si_3N_4$, $Al_2O_3$ type) precoated with an interphase of pyrolytic carbon or of boron nitride], have mechanical properties that are remarkable, making them suitable for numerous fields of application in the automobile, aviation, and aerospace industries, in particular. Nevertheless, insofar as said materials have poor resistance to being oxidized, their field of application has been limited, in particular to low temperatures.

SUMMARY OF THE INVENTION

The inventors have therefore been confronted with the technical problem of improving the resistance of such materials to being oxidized. To solve said problem, the inventors have devised an original form of external protection for said materials, that is capable of providing complete sealing against oxidizing gases, thereby enabling such materials to be used in an oxidizing atmosphere, in a temperature range extending from 500° C. to 1600° C.

According to the present invention, an original solution is proposed to the technical problem of protecting composite materials of the above type against oxidation at high temperature.

In general, the technical problem of providing composite materials with protection against being oxidized has already been investigated in depth.

In particular, it is known to provide such protection by depositing on said materials elements which constitute a glass or which are suitable for constituting a glass, e.g. after being oxidized. Said glass behaves in viscous manner at the temperatures at which the materials are used and therefore present healing properties. Nevertheless, that type of protection, which is implemented in particular on C/C type composite materials, is no longer effective at temperatures in excess of 1000° C.

To provide effective high temperature protection, proposals have also been made to deposit carbide or nitride coatings on the surface of composite materials by vapor deposition. That solution is not entirely satisfactory since high stresses are generated within said coated materials when they are raised to high temperature insofar as their structure no longer presents a uniform coefficient of thermal expansion.

Finally, according to application EP-A-483 009, it has been recommended to protect composite materials by forming a continuous phase within their matrices or at the surfaces thereof, which continuous phase is constituted by a ternary system of the Si—B—C type; said continuous phase is formed by chemical infiltration or by chemical vapor deposition starting from a gaseous phase. Like the previous technique, that technique is relatively cumbersome and expensive to implement.

The oxidizing mechanisms that take place within a monolithic ceramic raised to high temperature in an oxidizing atmosphere have also been described (more precisely the mechanisms that take place within the inter-grain phase of such a ceramic). Said mechanisms lead to a protective layer being formed that has a parabolic growth relationship, and that constitutes a diffusion barrier against oxygen.

A priori, the idea of taking advantage of such oxidizing mechanisms in the context of composite materials for the purpose of generating a protective layer in similar manner would have to be set aside insofar as any oxidation permanently damages the fibers present in the matrix of said composite materials. Nevertheless, it is on the basis of this idea that the inventors have developed the present invention in non-obvious manner.

Figure 1:
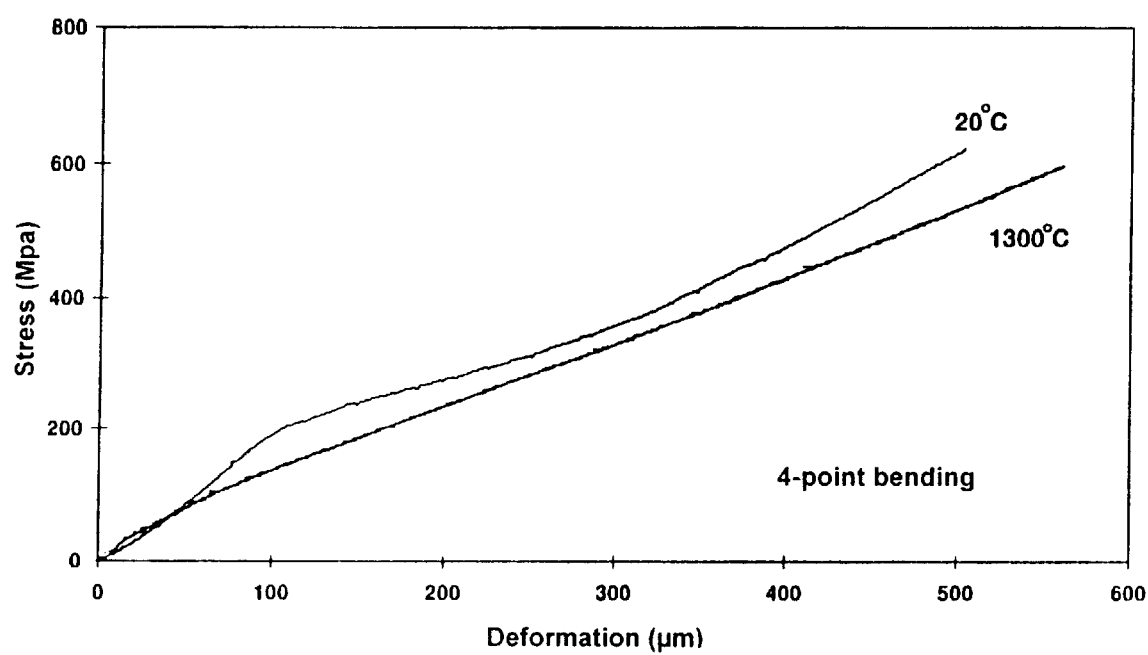
FIG. 1 depicts the results of a 4 point bending test of the claimed invention.

In a first aspect, the present invention relates to composite materials of the type mentioned above (more precisely of the type having a highly refractive ceramic matrix reinforced by fibers that are sensitive to oxygen at low temperature, said composite materials being made by a solid process using said fibers and a slip containing the ceramic powder and at least one densification additive) which materials are protected from being oxidized, even at high temperature, and the invention also relates to precursors for said protected composite materials. In characteristic manner, said protective composite materials have, over their entire outside surface, a complex layer which contains at least one silicate corresponding to said densification additive, silica, and a vitreous boron-containing silicate phase. Said complex layer constitutes the looked-for protective layer.

In characteristic manner, the precursors of said protective composite materials have over their entire outside surface at least one layer of a precursor for borosilicate glass or a layer of borosilicate glass.

The reader will already have understood that the composite materials of the invention have one or other of said layers at different stages in the implementation of an original process for generating a protective complex layer at the surface of prior art composite materials of the highly refractory ceramic matrix type reinforced by fibers that are sensitive to oxygen at low temperature, being made by a solid process using said fibers and a slip containing the ceramic powder and at least one densification additive.

The layer(s) of a borosilicate glass precursor naturally constitute(s) a precursor of the borosilicate glass layer which itself constitutes a precursor of the protective complex layer. In characteristic manner, within said protective complex layer, traces are to be found of the intermediate borosilicate glass layer (in particular traces of boron and of silica), and traces of the composite matrix are also to be found, more precisely traces of said matrix being oxidized (this is explained in greater detail with reference to the description of the method of obtaining the materials protected by the invention) (in particular silica and the silicate(s) corresponding to the densification additive(s).

The composite materials of the invention, whether protected finished materials or intermediate materials, advantageously have a matrix of the SiC, $Si_3N_4$, or SiAlON type.

The long reinforcing fibers they contain advantageously consist in carbon fibers or in ceramic fibers of the SiC, $Al_2O_3$, $Si_3N_4$ type precoated in an interface of pyrolytic carbon or of boron nitride.

The final layer of the borosilicate glass precursor used in the structure of intermediate composite materials of the invention generally results from superposing a plurality of layers. It is generally 3 mm to 5 mm thick. The borosilicate glass precursor generally consists in a non-aqueous solution containing silica and boron oxide powders.

The borosilicate glass layer which results from applying heat treatment (as explained in greater detail in the present description) to said final layer of borosilicate glass precursor is generally about 1 mm thick.

Concerning the protective complex layer of composite materials of the invention, as stated above, it contains:
- at least one silicate corresponding to the densification additive(s) originally added to the matrix of said materials;
- silica; and
- a vitreous boron-containing silicate phase.

Said complex layer results from applying heat treatment (as explained in greater detail further in the present description) to the composite material coated in the layer of borosilicate glass. Said complex layer is generally of a thickness lying in the range 200 $\mu$m to 300 $\mu$m.

By way of silicate(s) corresponding to the densification additive(s) originally present in the matrix of the composite materials, said complex layer generally contains silicate of yttrium and/or of aluminum and/or of magnesium and/or of at least one rare earth of the lanthanide series (in the range lanthanum to lutecium, advantageously consisting in said lanthanum, cerium, neodymium, or samarium); with this applying insofar as the densification additives used in conventional manner when making the slip generally consist in alumina ($Al_2O_3$) and/or yttrium oxide ($Y_2O_3$) and/or magnesium oxide (MgO) and/or oxides of rare earths in the lanthanide series (in the range lanthanum to lutecium, advantageously consisting in said lanthanum, cerium, neodymium, or samarium).

Yttrium and/or aluminum silicate is advantageously to be found in said protective complex layer of composite materials of the invention.

In a second aspect, the present invention relates to preparing the above-described composite materials, i.e. prior art composite materials of a certain type that are effectively protected in original manner against oxidation at high temperature, and to preparation intermediates (said materials having a highly refractory matrix reinforced by fibers that are sensitive to oxygen at low temperature, said materials being made by a solid process from said fibers and a slip containing the ceramic powder and at least one densification additive).

In a first step of the method of the invention, said prior art composite materials are in characteristic manner covered over their entire outside surface with at least one layer of a precursor of borosilicate glass (said composite materials coated in this way, constitute intermediate products, and are novel and inventive insofar as the person skilled in the art knowing the oxygen permeability at high temperature of borosilicate glass would not have designed them since their advantage would not have been apparent in any way). To obtain such a layer, a solution filled with appropriate substances ($B_2O_3$ and $SiO_2$) is placed on said surface and then the whole is subjected to heat treatment. Deposition can be performed in various ways. The solution can be deposited directly (as a coating) or in the form of a spray. Since $B_2O_3$ is a powder that is highly sensitive to water, the solution used is as dry as possible, for example a pure acetic acid solution, and said solution is prepared (by mixing) and is deposited under an inert atmosphere (e.g. nitrogen). The deposited solution is generally dried (heat treatment) at about 100° C. to 200° C. The deposition and heat treatment (drying) cycle is repeated on the various faces of the material as often as may be necessary to obtain the desired thickness over the entire outside surface thereof, which thickness generally lies in the range 3 mm to 5 mm.

Materials obtained from said first step are intermediate products or precursors in the meaning of the invention.

During a second step, at the end of which other intermediate products or precursors of the invention are obtained, namely composite materials of the type specified above coated with a layer of borosilicate glass (materials that are novel and inventive insofar as the person skilled in the art, knowing the oxygen permeability at high temperature of borosilicate glass would not have designed them and would not have imagined that they could be advantageous), said materials are subjected to heat treatment in an inert atmosphere at relatively high temperature so as to convert the glass precursor layer (generally layers) into a layer of glass. This step of the method of the invention, like the preceding step, is not novel per se (in the prior art such steps have been used on other substrates, in particular on C/C type composite materials obtained by a liquid or a gas process). Heat treatment is, per se, conventional. It is generally implemented at a temperature lying in the range 1000° C. to 1200°

C. under nitrogen. At the end of this step, a layer of glass is generated that is generally about 1 mm thick. Insofar as said generated glass remains sensitive to humidity, it is recommended to keep composite materials coated in this way, which constitute intermediate materials in the meaning of the invention, in such a manner that they are protected from said humidity.

The materials obtained at the end of this second step likewise constitutes intermediate products or precursors in the meaning of the invention.

During a third step, at the end of which the final products of the invention are obtained which are protected from oxidation at high temperature, said materials covered with said layer of borosilicate glass are then subjected to heat treatment in an oxidizing atmosphere. Said heat treatment implemented on an entirely original substrate is novel. It is generally implemented in air at a temperature greater than or equal to 1300° C., advantageously for a period of several hours (in particularly advantageous manner for a period of more than 5 hours). At the end of a plurality of complex chemical reactions that involve the matrix and its intergrain phase as well as the layer of glass, said heat treatment is designed to produce the complex layer for external protection which is characterized in that it contains at least one silicate corresponding to the densification additive(s) present in the matrix of the material, silica, and a vitreous boron-containing silicate phase. Said layer is not sensitive to humidity and it prevents oxygen diffusing to the reinforcing fibers of composite materials protected in this way.

Said layer is generally 200 μm to 300 μm thick.

Said layer is a result of the following reactions in particular:

oxidation of the matrix with formation of silica;

oxidation of the inter-grain phase with the formation of silicate(s) (such as $Y_2Si_2O_7$ and/or $Al_2Si_2O_7$ when $Y_2O_3$ and/or $Al_2O_3$ are involved as densification additives);

migration towards said outer layer of species corresponding to the densification additives (such as Y and/or Al if $Yi_2O_3$ and/or $Al_2O_3$ are included as densification additives);

partial evaporation of the $B_2O_3$ phase;

migration of boron towards the fiber/matrix interface;

oxidation of the reinforcing fibers over a short length (about 500 μm). This oxidation takes place mainly while temperature is rising under the oxidizing atmosphere (before said temperature reaches 1300° C.), during which time oxidation of the matrix and of the inter-grain phase is low. In an advantageous variant implementation of the method of the invention, it is recommended for the purpose of limiting said oxidation of the fibers to start said heat treatment under an inert atmosphere (e.g. under nitrogen) and to convert to an oxidizing atmosphere only once the temperature is higher than 1300° C.; and penetration of the glass into the zones where the fibers have been oxidized.

Said complex layer is particularly effective in protecting the composite materials of the above-specified type (obtained by a solid process in the presence of densification additive(s)) against oxidation at high temperature (up to 1500° C. to 1600° C.).

Said complex layer can be generated upstream from any use of said composite material (after being manufactured) and/or on first use thereof at high temperature in an oxidizing atmosphere.

In original manner, the formation of said complex layer for protecting composite materials in accordance with the invention makes use of one or more densification additives introduced in conventional manner in the solid process preparation of said materials (more precisely the additive(s) is/are introduced in the first step of making the slip, so as to enable it or them to function during the third step of densification).

Conventionally, such additive(s) is/are added in a total quantity that does not exceed about 30% by mass of the matrix (of the (non-protected) final composite material). In the context of the invention, there is, a priori, no need to add any greater quantity of such additive(s). The method of the invention is implemented on prior art composite materials obtained in conventional manner by a solid process for obtaining said composite materials that are to be protected from oxidizing at high temperature.

The invention is illustrated in the following example, both in its product aspect and in its method aspect.

EXAMPLE

Test pieces having dimensions of 40 mm×3 mm×4 mm of $C/Si_3N_4$ composite were rectified and polished after cutting up the sintered sample (the composite being obtained by the solid process, with $Y_2O_3$ (6.9% by mass) and $Al_2O_3$ (3.1% by mass) being used as densification additive). The test pieces were cleaned in a bath of hot acetone for 1 hour at 60° C. to eliminate the adhesive used or machining, and then dried in an oven for 1 hour at 60° C.

In parallel, the solution containing boron and silicon oxides ($B_2O_3$, $SiO_2$) was prepared as the precursor or borosilicate glass. 2.45 grams (g) of $B_2O_3$ and 0.6 g of $SiO_2$ (i.e. 20% by mass of the SiO2) were put into 15 ml of acetic acid. The solution prepared in that way was immediately isolated from the ambient atmosphere by a cover connected to a nitrogen cylinder. It was then stirred magnetically under a stream of nitrogen.

The test piece to be coated was placed on a hot plate (150° C.). A micropipette (50 μl) was used for taking the solution while it was being stirred and for depositing it on the faces of the test piece. This operation led to the deposited solution drying immediately, and was repeated several times until a thickness of about 4 mm was obtained.

The test piece coated in this way was then placed on a refractory brick support that was put into a furnace to perform heat treatment at 1100° C. for 3 hours under a stream of nitrogen. The purpose of the heat treatment was to transform the initial precursor layer into borosilicate glass.

The final step was heat treatment in air at 1300° C. for 10 hours. At the end of this oxidizing heat treatment, the final protective layer had been generated (the novel layer of the invention).

The effectiveness of said layer was tested.

A comparative test was performed.

The comparative test was applied to an untreated sample of the initial composite material (C/Si3N4) and to a sample of the same composite material that had been subjected to the treatment of the invention under the conditions of the above example.

The mechanical properties of the two samples were studied by tracking variation in stress with displacement during a 4-point bending test (in air):

at ambient temperature (20° C.) in air for the untreated sample; and at 1300° C. in air for the protected sample of the invention.

The results of the comparative test are given in accompanying FIG. 1.

From the curves, it is clear that the novel coating generated by the invention is entirely effective in protecting the carbon fibers since the test performed at 1300° C. does not alter the general appearance of the stress-deformation diagram.

What is claimed is:

1. Composite materials having a highly refractive ceramic matrix reinforced by fibers that are sensitive to oxygen at low temperature, said composite materials being made by a solid process from said fibers and a slip containing ceramic powder and at least one densification additive, said materials comprising over their entire outer surface;

either at least one layer of a precursor of borosilicate glass;

or a layer of borosilicate glass;

or a layer containing at least one silicate corresponding to said at least one densification additive; silica; and a vitreous boron-containing silicate phase; said layer protecting said composite materials in an oxidizing atmosphere, even at high temperature;

said composite materials having at least one of said layers at different stages in the implementation of treatment for the purpose of protecting them against being oxidized at high temperature.

2. Composite materials according to claim 1, wherein said ceramic matrix is a SiC, $Si_3N_4$, or SiAlON matrix.

3. Composite materials according to claim 1, wherein said fibers comprise long carbon fibers or long ceramic fibers SiC, $Al_2O_3$, or $Si_3N_4$ fibers precoated with an interface of pyrolytic carbon or of boron nitride.

4. Composite materials according to claim 2, wherein said fibers comprise long carbon fibers or long ceramic fibers SiC, $Al_2O_3$, or $Si_3N_4$ fibers precoated with an interface of pyrolytic carbon or of boron nitride.

5. Composite materials according to claim 1, wherein said at least one layer of a precursor of borosilicate glass is 3 mm to 5 mm thick.

6. Composite materials of claim 1, wherein said layer of borosilicate glass is about 1 mm thick.

7. Composite materials according to claim 1, wherein said outer layer comprises yttrium silicate and/or aluminum silicate and/or magnesium silicate and/or the silicate of at least one rare earth from the lanthanide series.

8. A method of preparing composite materials comprising a highly refractory ceramic matrix reinforced by fibers that are sensitive to oxygen, said method comprising making said materials by a solid process from said fibers and a slip containing ceramic powder and at least one densification additive, and also comprising, depositing over the entire outside surface of said composite materials obtained by a solid process, at least one layer of a precursor of a borosilicate glass;

optionally performing heat treatment in an inert atmosphere on said coated materials in order to convert said glass precursor into a borosilicate glass to obtain said materials coated with a layer of borosilicate glass;

optionally applying heat treatment in an oxidizing atmosphere to said materials coated with the layer of borosilicate glass to obtain said materials coated with a complex layer containing at least one silicate corresponding to said densification additive, silica, and a vitreous boron-containing silicate phase; said layer protecting said materials from being oxidized, even at high temperature.

9. A method according to claim 8, wherein the borosilicate glass precursor is deposited to a thickness of 3 mm to 5 mm.

10. A method according to claim 8, wherein the composite materials coated with the layer of borosilicate glass, the heat treatment under an inert atmosphere is implemented at a temperature in the range 1000° C. to 1200° C.

11. A method according to claim 9, wherein the composite materials coated with the layer of borosilicate glass, the heat treatment under an inert atmosphere is implemented at a temperature in the range 1000° C. to 1200° C.

12. A method according to claim 8, wherein the heat treatment under an oxidizing atmosphere of the composite materials coated with the layer of borosilicate glass is implemented in air at a temperature greater than or equal to 1300° C.

13. A method according to claim 9, wherein the heat treatment under an oxidizing atmosphere of the composite materials coated with the layer of borosilicate glass is implemented in air at a temperature greater than or equal to 1300° C.

14. A method according to claim 10, wherein the heat treatment under an oxidizing atmosphere of the composite materials coated with the layer of borosilicate glass is implemented in air at a temperature greater than or equal to 1300° C.

15. A method according to claim 12, wherein the composite materials coated with the layer of borosilicate glass are maintained in an inert atmosphere until the temperature has reached 1300° C.

16. A method according to claim 13, wherein the composite materials coated with the layer of borosilicate glass are maintained in an inert atmosphere until the temperature has reached 1300° C.

17. A method according to claim 14, wherein the composite materials coated with the layer of borosilicate glass are maintained in an inert atmosphere until the temperature has reached 1300° C.

* * * * *